United States Patent
Mobbs et al.

(10) Patent No.: US 10,148,882 B2
(45) Date of Patent: Dec. 4, 2018

(54) SYSTEM AND METHOD FOR FRAME CAPTURING AND PROCESSING

(71) Applicant: GoPro, Inc., San Mateo, CA (US)

(72) Inventors: Paul Mobbs, San Francisco, CA (US); Scott Patrick Campbell, Belmont, CA (US); David A. Newman, San Diego, CA (US); Kasturi Rangam, San Jose, CA (US); Sumit Chawla, San Carlos, CA (US)

(73) Assignee: GoPro, Inc., San Mateo, CA (US)

( * ) Notice: Subject to any disclaimer, the term of this patent is extended or adjusted under 35 U.S.C. 154(b) by 95 days.

(21) Appl. No.: 15/444,972

(22) Filed: Feb. 28, 2017

(65) Prior Publication Data

US 2017/0171443 A1    Jun. 15, 2017

Related U.S. Application Data

(63) Continuation of application No. 15/180,529, filed on Jun. 13, 2016, now Pat. No. 9,756,250, which is a (Continued)

(51) Int. Cl.
*H04N 5/232* (2006.01)
*H04N 1/21* (2006.01)
(Continued)

(52) U.S. Cl.
CPC .......... *H04N 5/2329* (2013.01); *H04N 1/215* (2013.01); *H04N 1/2137* (2013.01);
(Continued)

(58) Field of Classification Search
CPC .... H04N 5/2329; H04N 1/215; H04N 1/2137; H04N 5/23277; H04N 5/2355;
(Continued)

(56) References Cited

U.S. PATENT DOCUMENTS

| | | |
|---|---|---|
| 5,196,938 A | 3/1993 | Blessinger |
| 6,963,374 B2 | 11/2005 | Nakamura et al. |

(Continued)

FOREIGN PATENT DOCUMENTS

| | | |
|---|---|---|
| CN | 101223769 | 7/2008 |
| JP | 10-145435 B1 | 5/1998 |

(Continued)

OTHER PUBLICATIONS

United States Office Action for U.S. Appl. No. 14/189,967, dated Apr. 28, 2014, 14 pages.

(Continued)

*Primary Examiner* — John Villecco
(74) *Attorney, Agent, or Firm* — Young Basile Hanlon & MacFarlane, P.C.

(57) ABSTRACT

Systems and methods are provided that capture and process frames of frame data. An image sensor captures frames of frame data representative of light incident upon the image sensor using a rolling shutter and outputs the frames of frame data. The image sensor captures at least one of the frames over a frame capture interval and then waits over a blanking interval before capturing another frame. A buffer receives and stores the frames output by the image sensor. An image signal processor retrieves the frames from the buffer and processes the frames over successive frame processing intervals to generate a video having a time interval per frame greater than the frame capture interval. At least one of the successive frame processing intervals is greater than the frame capture interval and is less than or equal to a sum of the frame capture interval and the blanking interval.

20 Claims, 5 Drawing Sheets

Related U.S. Application Data continuation of application No. 14/451,437, filed on Aug. 5, 2014, now Pat. No. 9,392,194, which is a continuation of application No. 14/189,967, filed on Feb. 25, 2014, now Pat. No. 8,830,367.

(60) Provisional application No. 61/893,805, filed on Oct. 21, 2013.

(51) Int. Cl.
*H04N 5/353* (2011.01)
*H04N 5/355* (2011.01)
*H04N 101/00* (2006.01)

(52) U.S. Cl.
CPC ..... *H04N 5/23229* (2013.01); *H04N 5/23232* (2013.01); *H04N 5/23277* (2013.01); *H04N 5/3532* (2013.01); *H04N 5/35572* (2013.01); *H04N 2101/00* (2013.01)

(58) Field of Classification Search
CPC ........... H04N 5/35536; H04N 5/35572; H04N 5/35581; H04N 5/23232; G06T 1/20; G06T 2200/28
See application file for complete search history.

(56) References Cited

U.S. PATENT DOCUMENTS

| | | |
|---|---|---|
| 7,142,731 B1 | 11/2006 | Toi |
| 7,671,896 B2 | 3/2010 | Kubo |
| 8,194,146 B2 | 6/2012 | Lin et al. |
| 8,218,065 B2 | 7/2012 | Suzuki et al. |
| 8,488,019 B2 | 7/2013 | Toyoda |
| 8,559,763 B2* | 10/2013 | Chen ................... H04N 7/0137 348/452 |
| 8,854,488 B2 | 10/2014 | Shiomi |
| 9,154,758 B2 | 10/2015 | Lee |
| 9,241,109 B2 | 1/2016 | Watanabe |
| 9,781,310 B2* | 10/2017 | Jacumet ............... H04N 5/2251 |
| 2003/0122952 A1 | 7/2003 | Kuroiwa |
| 2003/0142217 A1 | 7/2003 | Maehama et al. |
| 2003/0160874 A1 | 8/2003 | Kuroiwa |
| 2003/0184662 A1 | 10/2003 | Porter et al. |
| 2003/0222998 A1 | 12/2003 | Yamauchi et al. |
| 2004/0080626 A1 | 4/2004 | Fukuzawa |
| 2005/0052542 A1 | 3/2005 | Iwai et al. |
| 2005/0117029 A1 | 6/2005 | Shiomi |
| 2006/0264733 A1 | 11/2006 | Masaki |
| 2006/0268124 A1 | 11/2006 | Fishman et al. |
| 2007/0070212 A1 | 3/2007 | Haneda |
| 2007/0195182 A1 | 8/2007 | Ito |
| 2007/0279512 A1 | 12/2007 | Maruyama et al. |
| 2008/0028431 A1* | 1/2008 | Park ........................ G09G 5/003 725/90 |
| 2009/0059031 A1 | 3/2009 | Miyakoshi |
| 2010/0092151 A1 | 4/2010 | Miyakoshi |
| 2010/0165151 A1 | 7/2010 | Chitnis et al. |
| 2010/0220216 A1 | 9/2010 | Fishman et al. |
| 2011/0069205 A1 | 3/2011 | Kasai et al. |
| 2011/0074943 A1 | 3/2011 | Modell et al. |
| 2011/0157426 A1 | 6/2011 | Lin et al. |
| 2011/0176028 A1 | 7/2011 | Toyoda |
| 2011/0249135 A1 | 10/2011 | Minato |
| 2012/0044381 A1 | 2/2012 | Jannard et al. |
| 2012/0268617 A1* | 10/2012 | Ishikawa ................ H04N 5/232 348/221.1 |
| 2012/0287294 A1 | 11/2012 | Kaizu |
| 2012/0307102 A1 | 12/2012 | Yuyama |
| 2012/0320236 A1 | 12/2012 | Toyoda |
| 2013/0002901 A1 | 1/2013 | Athreya |
| 2013/0258136 A1 | 10/2013 | Lee |
| 2014/0192246 A1 | 7/2014 | Lee |
| 2014/0232929 A1 | 8/2014 | Ichikawa |
| 2015/0326798 A1 | 11/2015 | Muto |
| 2016/0100129 A1* | 4/2016 | Im ........................ H04N 7/0127 348/441 |
| 2016/0150130 A1 | 5/2016 | Noro |

FOREIGN PATENT DOCUMENTS

| | | |
|---|---|---|
| JP | 2001-22922 B2 | 1/2001 |
| JP | 2009065320 A | 3/2009 |

OTHER PUBLICATIONS

International Search Report and Written Opinion for International Application No. PCT/US14/58467, dated Oct. 20, 2014, 11 pages.
Extended European Search Report, EP Appl. No. 14855745.7, dated Aug. 8, 2016, 13 pages.
United States Office Action for U.S. Appl. No. 14/451,437, dated Nov. 30, 2015, 21 pages.
United States Office Action for U.S. Appl. No. 14/451,437, dated Sep. 17, 2015, 15 pages.
United States Office Action for U.S. Appl. No. 14/451,437, dated May 26, 2015, 14 pages.

* cited by examiner

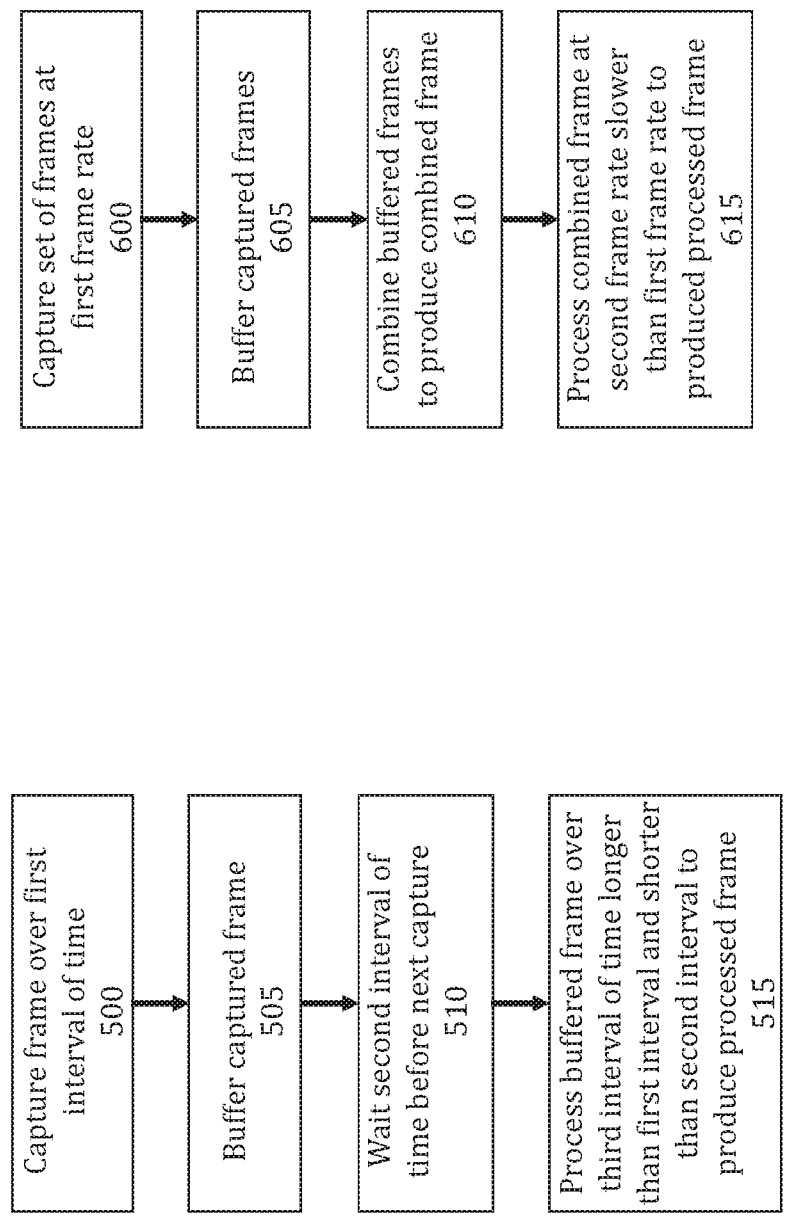

SYSTEM AND METHOD FOR FRAME CAPTURING AND PROCESSING

CROSS-REFERENCE TO RELATED APPLICATION(S)

This application is a continuation of U.S. application Ser. No. 15/180,529, filed Jun. 13, 2016, which is a continuation of U.S. application Ser. No. 14/451,437, filed Aug. 5, 2014, now U.S. Pat. No. 9,392,194, which is a continuation of U.S. application Ser. No. 14/189,967, filed Feb. 25, 2014, now U.S. Pat. No. 8,830,367, which claims the benefit of U.S. Provisional Application No. 61/893,805, filed on Oct. 21, 2013, each of which is incorporated herein by reference in its entirety.

BACKGROUND

In digital camera systems, such as CMOS image sensor-based systems, the pixel array is generally read out in what is called a "rolling shutter" method. In rolling shutter, the exposure and reading of the array begins at the top of the array for each frame and proceeds to roll down the array throughout the frame capture interval of time. Because of this, action captured at the beginning of a frame capture interval of time is captured only at the top of the frame (scene), action captured in the middle of a frame capture interval is captured in the center of the frame and action captured at the end of the frame capture interval is captured at the bottom of the frame. Thus, when an object moves during the frame capture interval (or when the camera moves during the same), the captured reproduction of the object may be a slanted or swizzled version of the object, skewed relative to the motion between the object and the camera over the total frame capture interval. These effects are referred to herein as "rolling shutter artifacts".

Rolling shutter artifacts are undesirable due to the distortion they impose on the object within a captured image. One method to overcome this issue is to use a global shutter, wherein the entire image sensor array is exposed at once, then blinded (either via mechanical shutter or electrically-controlled light sensitivity or other). The pixel data is then read out in a rolling manner. This approach is challenging to implement in small camera systems and/or cameras with small image sensor pixels. Another method to minimize rolling shutter artifacts is to capture the image frames at very high rates. While this minimizes the rolling shutter time (and thus minimizes rolling shutter artifacts), it uses much more power than running systems at nominal frame rates and can create bottlenecks at various points within the image capture architecture (such as at an image sensor and/or image processor) unable to keep up with such a rapid rate of frame capture. It is thus desirable to capture images with minimized rolling shutter artifacts without imposing the size, weight, cost, and/or power and performance requirements of the solutions listed above.

SUMMARY

Disclosed herein are implementations of systems and techniques for frame capturing and processing.

In an implementation, a system is provided that captures and processes frames of frame data. The system includes an image sensor that captures frames of frame data representative of light incident upon the image sensor using a rolling shutter and that outputs the frames of frame data, wherein the image sensor captures at least one of the frames over a frame capture interval and then waits over a blanking interval before capturing another frame, a buffer that receives and stores the frames output by the image sensor, and an image signal processor that retrieves the frames from the buffer and processes the frames over successive frame processing intervals to generate a video having a time interval per frame greater than the frame capture interval, wherein at least one of the successive frame processing intervals is greater than the frame capture interval and is less than or equal to a sum of the frame capture interval and the blanking interval.

In an implementation, a method is provided for capturing and processing frames of frame data. The method includes capturing, by an image sensor, frames of frame data representative of light incident upon the image sensor at a frame capture rate using a Bayer color filter array and a rolling shutter, wherein at least one frame is captured over a frame capture interval before another frame is captured after a blanking interval, storing, using a buffer, at least some of the frames captured by the image sensor, retrieving, by an image signal processor, a subset of the frames captured by the image sensor from the buffer according to a frame processing rate that is one half or less of the frame capture rate, and processing, by the image signal processor, the subset of the frames over successive frame processing intervals to generate a video having an output frame rate less than the frame capture rate.

In an implementation, a system is provided that captures and processes frames of frame data. The system includes an image sensor that captures frames of frame data representative of light incident upon the image sensor at a frame capture rate using a Bayer color filter array and a rolling shutter and that outputs at least some of the frames of frame data, wherein the image sensor captures at least one of the frames over a frame capture interval and then waits over a blanking interval, a buffer that receives and stores at least some of the frames output by the image sensor, and an image signal processor that retrieves, from the buffer, a subset of the frames captured by the image sensor as retrieved frames according to a frame processing rate that is one half or less of the frame capture rate and that processes the retrieved frames at the frame processing rate to generate a video having an output frame rate less than the frame capture rate.

These and other aspects of the present disclosure are disclosed in the following detailed description, the appended claims, and the accompanying figures.

BRIEF DESCRIPTION OF THE DRAWINGS

FIG. 5 is a flow chart illustrating image capture in a sparse capture mode, according to one embodiment.

FIG. 6 is a flow chart illustrating image capture in a combination mode, according to one embodiment.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Architecture

Figure 1:
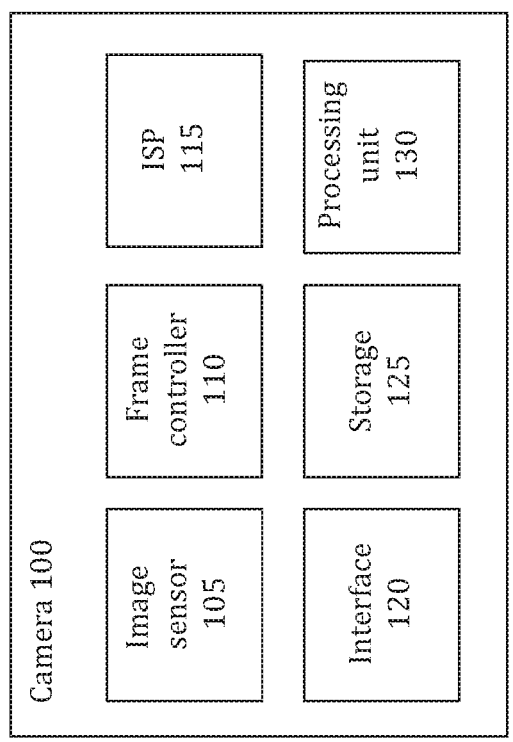
FIG. 1 is a block diagram illustrating an embodiment of a camera system, according to one embodiment.

FIG. 1 is a block diagram illustrating an embodiment of a camera system, according to one embodiment. The camera 100 of the embodiment of FIG. 1 includes an image sensor 105, a frame controller 110, an ISP 115, an interface module 120, a storage module 125, and a processing unit 130. It should be noted that in other embodiments, the camera 100 can include different or additional components than those illustrated herein. The components of the camera 100 are communicatively coupled, for instance via a communications bus not illustrated herein.

The image sensor 105 is configured to convert light incident upon the image sensor chip into electrical signals representative of the light incident upon the image sensor ("image data" hereinafter). Such a process is referred to as "capturing" image data, and capturing image data representative of an image is referred to as "capturing an image" or "capturing a frame". The image sensor can include a Bayer color filter array configured to capture image data and output raw Bayer pattern data. The image sensor can be configured to capture images at one or more frame rates (such as 120 frames per second, or fps, 60 fps, 48 fps, 30 fps, and the like), and can be configured to capture an image in a first interval of time and then wait a second interval of time before capturing another image (during which no image data is captured). The image sensor can include a charge-coupled device ("CCD") image sensor, a complementary metal-oxide semiconductor ("CMOS") image sensor, or any other suitable image sensor configured to convert captured light incident upon the image sensor chip into image data.

The frame controller 110 is configured to manipulate the capturing of image data by the image sensor 105 and the processing of image data by the ISP 115, and/or to manipulate captured image data prior to the processing of the captured image data by the ISP. The frame controller is discussed below in greater detail. It should be noted that although the frame controller is illustrated in the embodiment of FIG. 1 is a separate component, in practice, the frame controller can be implemented within another component of the camera 100, such as within the image sensor or the ISP. In addition, in some embodiments, the image sensor is implemented within the ISP, or the ISP is implemented within the image sensor.

The ISP 115 is configured to process captured image data, such as image data captured by the image sensor 105 or image data manipulated by the frame controller 110, to produce a processed image. The processed image can be an image file formatted for display on a display screen, for storage in memory, and the like. In one embodiment, the ISP performs processing steps including clean Bayer processing, demosaicing, and the like, as well as compression to format the captured image data for output. In various embodiments, the ISP processes the image data to generate image or video files in standard formats, such as JPEG, PNG, TIFF, AVI, or MPEG.

The interface module 120 allows a user of a camera 100 to operate the camera, to configure the camera into one or more camera modes, to manipulate camera settings, and the like. In one embodiment, the interface module allows a user to configure the camera to operate in a sparse capture mode (described below in greater detail), or in a combination mode (described below in greater detail). The interface module can also allow a user of the camera to begin or end capturing images or video, and can allow a user of the camera to playback or edit captured images or video. In addition, the interface module can allow a user to output captured images or video stored within the camera (for instance, by the storage module 125) to an external storage module, display, or the like.

The storage module 125 includes a non-transitory computer-readable storage medium configured to store data. The storage module can include any suitable type of storage, such as random-access memory, solid state memory, a hard disk drive, buffer memory, and the like. The storage module can store image data captured by the image sensor 105, for instance prior to manipulation by the frame controller 110 or processing by the ISP 115. The storage module can also store image data for buffering during manipulation by the frame controller, or can store manipulated image data output by the frame controller prior to processing by the ISP. The storage module can store image data processed by the ISP, such as image or video files, prior to playback from the storage module or outputting by the interface module 120 to an external entity.

The functions described herein of the components of the camera and of the camera itself can be controlled by the processing unit 130. In one embodiment, the processing unit includes a processor and a memory comprising a non-transitory computer-readable storage medium storing computer-executable program instructions for capturing image data, manipulating the capture of image data, manipulating captured image data, processing image data, and manipulating the processing of image data, among other functions. In such an embodiment, the processor can execute the computer-executable program instructions to perform these functions. It should be noted that the processing unit can implement image capture, manipulation, and processing in hardware, firmware, or a combination of hardware, firmware, and/or software. In some embodiments, the storage module 125 stores the computer-executable program instructions for performing the functions described herein for execution by the processing unit.

Figure 2:
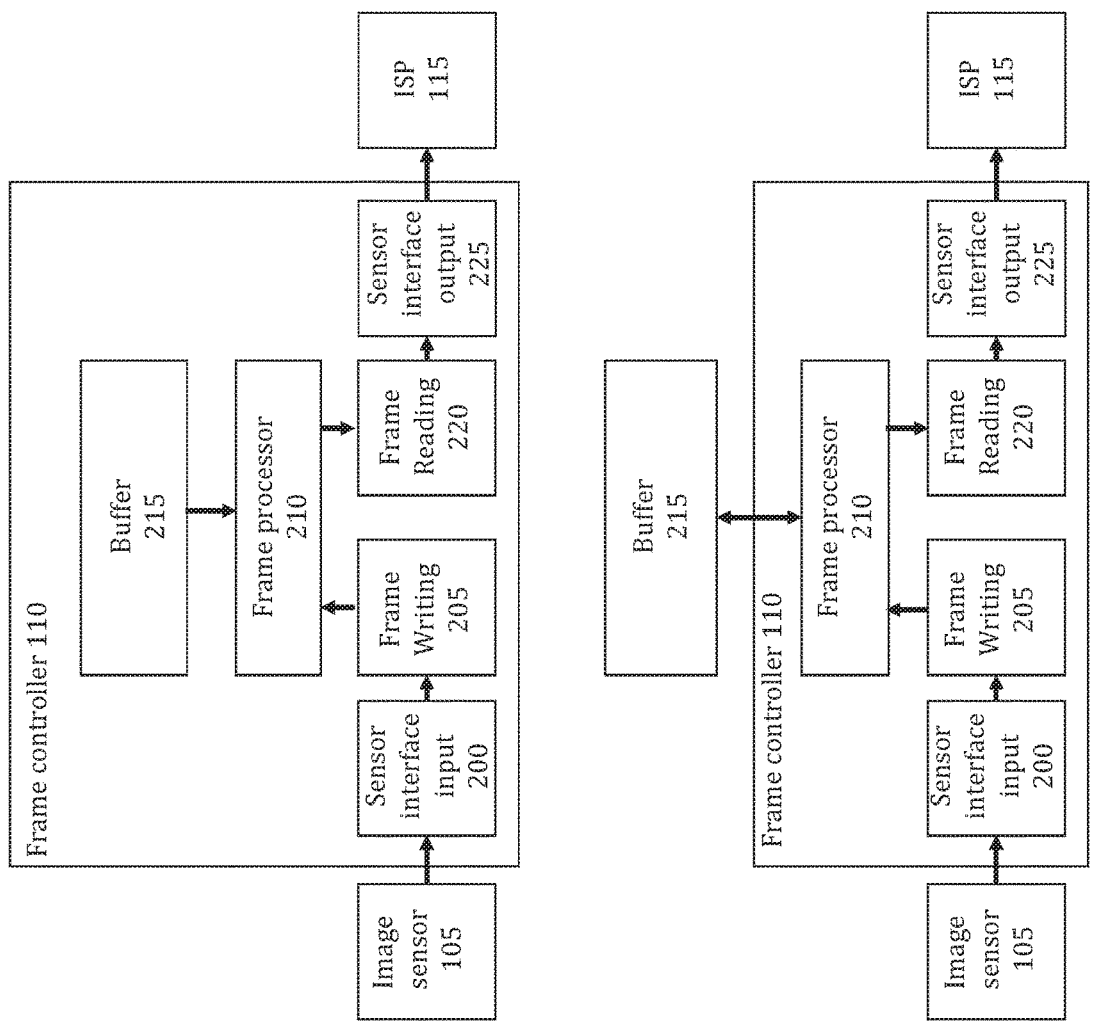
FIG. 2a illustrates data flow through components of the camera system with an internal buffer, according to one embodiment.
FIG. 2b illustrates data flow through components of the camera system with an external buffer, according to one embodiment.

FIGS. 2a and 2b illustrate data flow through components of the camera system with an internal buffer and an external buffer, respectively, according to one embodiment. The frame controller 110 of the embodiments of FIGS. 2a and 2b include a sensor interface input 200, a frame writing module 205, a frame processor 210, a frame reading module 220, and a sensor interface output 225. In addition, the frame controller of the embodiment of FIG. 2a includes a buffer 215, while the buffer is external to the frame controller in the embodiment of FIG. 2b. In other embodiments, the frame controllers of FIGS. 2a and 2b include different or additional components than those described herein.

The sensor interface input 200 receives captured image data from the image sensor 105 and provides the received image data to the frame writing module 205. The frame writing module provides the captured image data to a frame processor 210 for manipulation or processing, or for storage within the buffer 215 or within another memory not illustrated in the embodiments of FIGS. 2a and 2b. As discussed below, the frame processor 210 can manipulate image data stored in the buffer or received from the frame writing module. In addition, the frame processor can manipulate the capture of image data by the image sensor and/or the processing of image data by the ISP 115. The frame reading module 220 receives image data from the frame processor (for instance, directly from the frame processor, or from the buffer or any other memory not illustrated in the embodiments of FIGS. 2a and 2b), and provides the image data to the sensor interface output 225, which outputs the image data to the ISP. In the embodiment of FIG. 2b, the buffer is located externally to the frame controller, and can be located within the camera 100 (for instance, within the storage module 125) or external to the camera.

It should be noted that in some embodiments not described further herein, a camera 100 can implement a buffer or other memory instead of a frame controller 110. In such embodiments, an external controller (such as the processing unit 130) can manipulate the capture of image data by the image sensor 105 (which writes captured image data to the buffer), and can manipulate the processing of the image data stored in the buffer by the ISP 115. In addition, in some embodiments not described further herein, the camera 100 can implement an image capture accelerator or other companion device between the image sensor and the ISP instead of a frame controller. In some embodiments, frames are stored in the buffer 215 or in the storage module 125 in a circular manner, such that frames are stored in order of capture, and new frames replace older frames when the buffer or storage module becomes full.

By implementing the frame controller 110, the camera 100 can beneficially capture frames using the image sensor 105 at a higher rate than the ISP 110 can process frames. Relatedly, by utilizing the frame controller, a frame can be processed by the ISP over a longer time interval (the "frame processing interval" or "image processing interval") than the interval of time during which the frame is captured by the image sensor (the "frame capture interval" or "image capture interval"). Finally, by utilizing a frame controller, multiple frames can be captured and written to the frame controller, can be combined to produce a combined frame, and the combined frame can be processed by the ISP.

As noted above, the capture of images by the image sensor 105 while the camera 100 is moving, while an object in the image being captured is moving, or both, can result in rolling shutter artifacts within the captured image. Such rolling shutter artifacts can be reduced by manipulating the capturing and processing of frames (in a "sparse capture mode" as described below), or by manipulating captured frames (in a "combination mode" as described below).

Sparse Capture Mode

Figure 3:
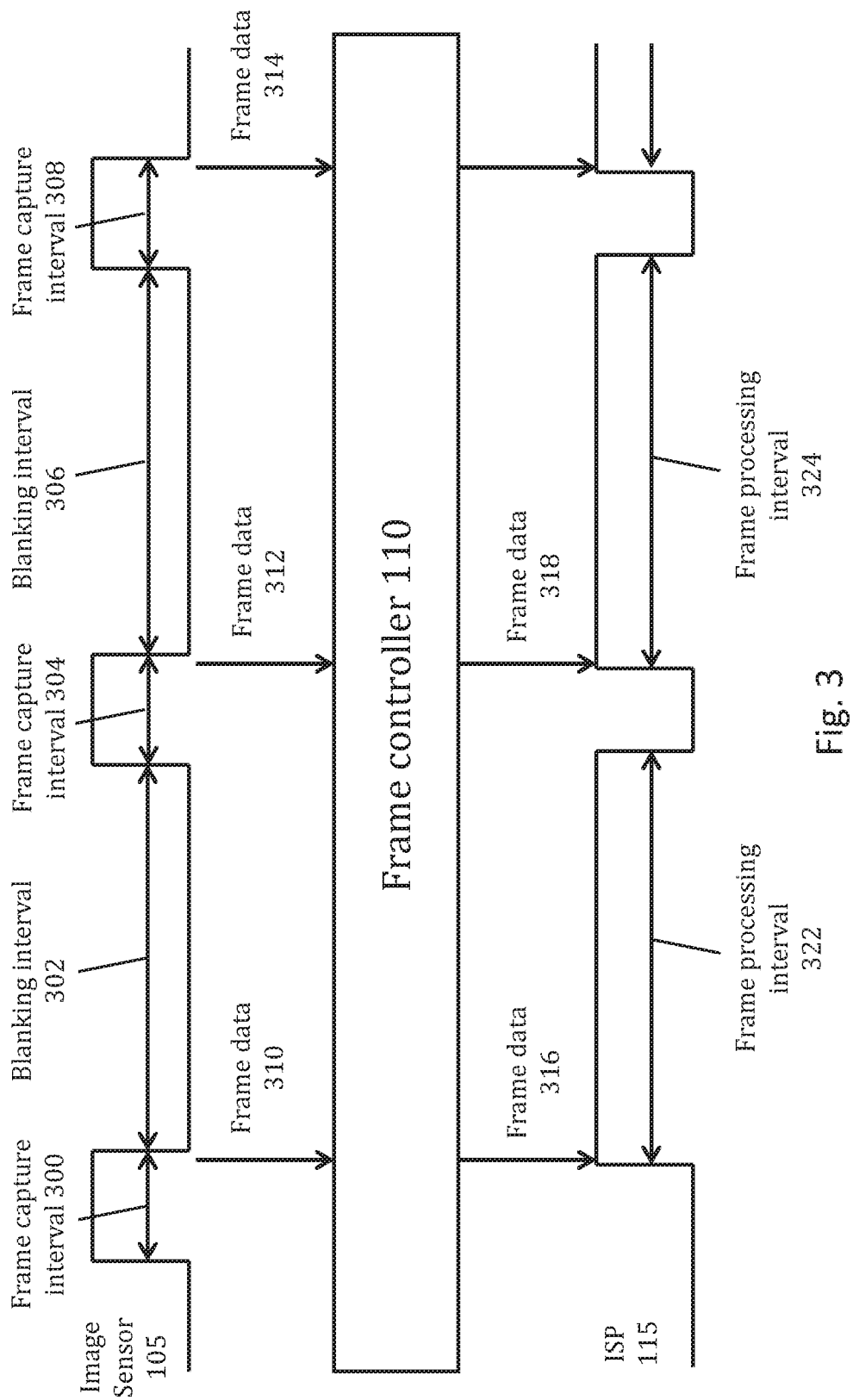
FIG. 3 illustrates data flow during image capture in a sparse capture mode, according to one embodiment.

FIG. 3 illustrates data flow during image capture in a sparse capture mode, according to one embodiment. The image sensor 105 is configured to capture a frame over a frame capture interval of time. In the embodiment of FIG. 3, frame capture intervals 300, 304, and 308 are shown. In some embodiments, the frame capture interval is defined by a frame capture rate, and the frame capture interval and/or frame capture rate are selected such that rolling shutter artifacts are substantially minimized when capturing frames. For example, a frame capture rate of 120 fps may be selected, resulting in a frame capture interval of 0.00833 seconds or less. Similarly, a frame capture rate of 240 fps may be selected, resulting in a frame capture interval of 0.00417 seconds or less. The image sensor is also configured to wait for a period of time between frame capture intervals without capturing frame data. These intervals of time are referred to herein as "blanking intervals". In the embodiment of FIG. 3, blanking intervals 302 and 306 are shown. In some embodiments, the image sensor is exposed to light during the frame capture interval, and is shielded from light during the blanking interval.

In some embodiments, the length of the blanking interval is selected based on a rate that the ISP 115 can process frames. For instance, if the ISP can process a frame in a given length of time (a "frame processing interval" hereinafter), the blanking interval can be selected such that the sum of the frame capture interval and the blanking interval is greater than the frame processing interval. In some embodiments, the blanking interval is longer than the frame capture interval, for instance by a factor of 2 or 3 or more, and in other embodiments, the blanking interval is shorter than the frame capture interval, for instance by a factor of 1.5, 2, or more. In some embodiments, the frame capture interval and the blanking interval are approximately the same length. It should be noted that in these embodiments and others, the image sensor can be configured to capture frames over a frame capture interval consistent with a first frame capture rate, but can incorporate a blanking interval between frame captures, resulting in an effective second frame capture rate slower than the first frame capture rate.

The image sensor 105 captures a frame during a frame capture interval, creating frame data. The image sensor writes the frame data to a frame controller 110. In the embodiment of FIG. 3, frame data 310 is provided by the image sensor to the frame controller after frame capture interval 300, frame data 312 is provided by the image sensor to the frame controller after frame capture interval 304, and frame data 314 is provided by the image sensor to the frame controller after frame capture interval 308. The frame controller outputs the frame data to the ISP 115. In the embodiment of FIG. 3, frame data 316 is provided to the ISP by the frame controller at the beginning of the frame processing interval 322, and frame data 318 is provided to the ISP by the frame controller at the beginning of the frame processing interval 324. In some embodiments, the image sensor sets a flag within the frame controller indicating that the frame controller contains frame data to be read by the ISP. The ISP can be configured to read the frame data from the frame controller, for instance in response to detecting frame data stored in the frame controller, in response to detecting a flag set in the frame controller indicating that the frame controller is storing frame data to be read, or in response to the ISP completing the processing of previous frame data.

The ISP 115 receives (or reads) frame data stored in the frame controller associated with a captured frame, and processes the frame data during a frame processing interval. The ISP can be configured to perform any image or frame processing operations during the frame processing interval. In some embodiments, the ISP encodes the frame data into a renderable or displayable image, for instance in the JPEG format or any other suitable format. In some embodiments, the frame processing interval is substantially longer than the frame capture interval, for instance by a factor of ×1.5, ×2, ×3, ×4, or more. The frame processing interval can be selected based on the configuration or capabilities of the ISP. For example, if the ISP can process frames at a first resolution at 60 fps, and can process frames at a second, higher resolution at 30 fps, a frame processing interval of 0.017 seconds or less can be selected when processing frame data at the first resolution, and a frame processing interval of 0.033 seconds or less can be selected when processing frame data at the second resolution.

In some embodiments, the frame data captured by the image sensor 105 is video data. In these embodiments, the ISP 115 can process the frame data as if the frame data were captured at a slower frame rate or over a longer frame capture interval than the image sensor captured the frame data. For instance, if the frame capture interval in which a frame is captured corresponds to a frame rate of 120 fps (a frame capture interval of 0.00833 seconds followed by a blanking interval of 0.0250 seconds), the ISP can process the resulting frame data such that the frame data is encoded into video over a frame processing interval corresponding to a frame rate 30 fps (a frame processing interval of 0.0333 seconds). The ISP can output the processed frame data to a module or memory external to the camera 100, or can store the processed frame data in an internal memory.

The operation of the camera 100 in the sparse capture mode beneficially allows for 1) the capture of frames within a short enough frame capture interval that rolling shutter artifacts are substantially minimized, while 2) capturing frames at a slow enough effective frame rate that the ISP 115 can process the captured frames at a frame processing rate that minimizes the power or resource requirements of the ISP. Although the embodiment of FIG. 3 includes a frame controller, it should be noted that sparse capture mode as described herein can be implemented in embodiments without a frame controller. In such embodiments, the image sensor 105 captures frame data at a frame capture interval corresponding to a frame capture rate, and outputs the captured frame data at a slower frame rate directly to the ISP for processing at the slower frame rate. Alternatively, the image sensor 105 can capture frame data at a frame capture interval, can stop capturing frame data for a blanking interval until a capture enable signal is received from the ISP, can output the frame data to the ISP for processing over a frame processing interval, and the ISP can provide a capture enable signal to the image sensor to capture a subsequent frame.

It should be noted that in some embodiments, a sparse capture mode can be implemented with a small or substantially zero-length blanking interval. For example, the image sensor 105 can capture frames at a frame capture rate with minimal blanking. In these embodiments, the image sensor can be configured to provide only a subset of captured frames to the frame controller 110. For instance, the image sensor may provide only every 4th frame to the frame controller, and the ISP 115 can be configured to read and process the provided frames as illustrated in FIG. 3. Alternatively, the image sensor can be configured to provide every captured frame to the frame controller, and the ISP can be configured to read only a subset of the provided frames from the frame controller. For instance, the ISP can be configured to read and process only every 3rd frame from the frame controller, and the unread frames can be subsequently deleted or overwritten with new frames from the image sensor.

In some embodiments, the frame controller 110 selects the length of the frame capture interval and provides the selected frame capture interval length to the image sensor 105 for implementation. In addition, the frame controller can select the length of the blanking interval, and can provide selected blanking interval length to the image sensor for implementation. Likewise, the frame controller can select the length of the frame processing interval, and can provide the selected frame processing interval length to the ISP 115.

The lengths of the frame capture interval, the blanking interval, and the frame processing interval can be based on any suitable factors, such as the capabilities or available resources of the image sensor or the ISP, the resolution of image data being captured, the fill rate of a buffer or other memory within the frame controller, a camera setting or operation mode, or any other suitable factor. The frame controller can also select interval lengths based on other interval lengths. For instance, the frame controller can select the frame capture interval length and/or the blanking interval length based on the frame processing interval length and vice versa, can select the frame capture interval length based on the selected blanking interval length and vice versa, and can select the frame processing interval length based on one or more of the frame capture interval length and the blanking interval length. In addition, it should be noted that a component other than the frame controller can select one or more of the frame capture interval length, the blanking interval length, and the frame processing interval length. For instance, these interval lengths can be selected by the image sensor, the ISP, the processing unit 130, or any other component or entity.

Combination Mode

Figure 4:
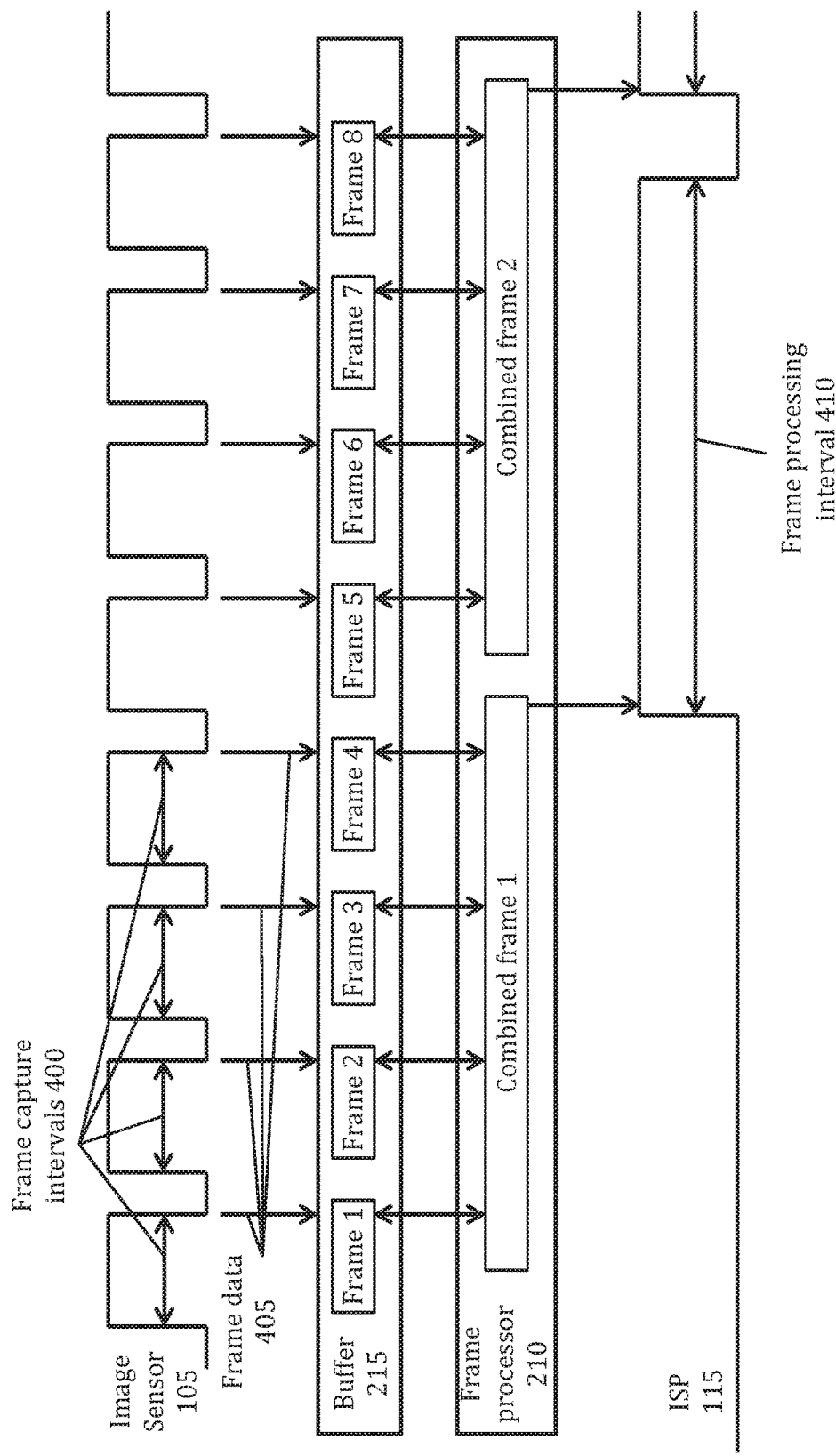
FIG. 4 illustrates data flow during image capture in a combination mode, according to one embodiment.

FIG. 4 illustrates data flow during image capture in a combination mode, according to one embodiment. The image sensor 105 is configured to capture a frame over a frame capture interval of time. In the embodiment of FIG. 4, several frame capture intervals 400 are illustrated. As noted above, the frame capture interval can be defined by a frame capture rate, and the frame capture interval and/or frame capture rate are selected such that rolling shutter artifacts are substantially minimized when capturing frames. The image sensor writes captured frame data 405 to a buffer 215. In the embodiment of FIG. 4, frame 1, frame 2, frame 3, and frame 4 associated with the frame data 405 are written to the buffer. The frame processor 210 combines the captured frames into combined frames for processing. In the embodiment of FIG. 4, frame 1, frame 2, frame 3, and frame 4 are combined into a combined frame 1. In some embodiments, the frame processor 210 and the buffer 215 are included within the frame controller 110, though in other embodiments, they are stand-alone components.

It should be noted that although a particular embodiment of a camera 100 combination mode is illustrated in FIG. 4, in practice, a combination mode can be implemented in a camera in a number of ways. For instance, instead of combining 4 frames, the frame processor can combine all or portions of 2 frames, 3 frames, 5 frames, or more. In some embodiments, the frame processor combines a pre-determined number of frames into a combined frame, though in other embodiments, the number of frames combined into a combined frame varies from combined frame to combined frame, or varies based on a setting selected by a user of the camera 100. Further, although the primary description of the combination mode herein focuses on the embodiment of FIG. 4, other embodiments of operation in a combination mode are described below.

The ISP 115 receives or reads the combined frame from the frame processor 210 and processes the combined frame in a frame processing interval. For instance, the ISP receives the combined frame 1 from the frame processor and processes the combined frame 1 over the frame processing interval 410 to produce a processed frame. The ISP then outputs the processed frame to a module or memory external to the camera 100, or can store the processed data in an internal memory. The ISP temporally transcodes the combined frames into video renderable or displayable at a slower frame rate than the frame capture rate.

In some embodiments, the frame processor 210 requests the frames from the buffer 215, and in some embodiments, the buffer automatically outputs the frames to the frame processor. In some embodiments, the frame processor or any other module can inform the buffer of a particular number of frames to be combined by the frame processor, and the buffer can indicate to the frame processor when the particular number of frames are stored by the buffer. In response, the frame processor can request the frames from the buffer, and the buffer can provide the frames to the frame processor. Alternatively, the buffer can output frames to the frame processor as they as received from the image sensor 105, and the frame processor can combine the received frames when a pre-determined number of frames are received.

The frame processor 210 can be configured to combine frames by any suitable method. In one embodiment, the frame processor combines corresponding pixels in each frame, for instance by digitally summing the information of each corresponding pixel in each frame. Alternatively, the frame processor can combine corresponding pixels by averaging the pixel information (such as the luminance or chrominance information) for each of the corresponding pixels, by averaging only similar pixels (corresponding pixels above a threshold measure of similarity), by de-noising pixels determined to represent a stationary part of a frame, and the like. Combining each set of corresponding pixels results in a combined frame, with each pixel of the combined frame representing a combination of the corresponding pixels in each of the frames. In some embodiments, pattern noise reduction, defective pixel correction, or any other image repair or calibration process can be implemented by the frame processor on received frames either before or during combination.

The combination of frames into a combined frame prior to processing by the ISP 115 can beneficially reduce the processing resource and power requirements of the ISP by reducing the total number of frames that are processed by the ISP. For instance, in the embodiment of FIG. 4, combining every four frames into a combined frame reduces the number of frames processed by the ISP by 75%. This beneficially allows the ISP to process frames at a first rate (e.g., 30 frames per second) while the image sensor 105 captures frames at a second rate (e.g., 120 frames per second), reducing the processing load of the ISP while increasing the amount of image information available to the ISP by increasing the number of captured frames (and the amount of frame data) captured by the image sensor. By increasing the amount of frame data available to the ISP for processing, the dynamic range and/or signal-to-noise ratio of image data processed by the ISP can be improved. Further, various image effects can be incorporated into the processed image data as a result of the increase in frame data, such as a simulated capture angle or weighted motion blur. The processed image data captured in a combination mode can beneficially improve image quality while reducing the effect of rolling shutter artifacts.

In one embodiment, a camera 100 can operate in a combination mode without the use of a buffer 215. In such embodiments, the image sensor 105 can directly provide captured frames to the frame processor 210. In some embodiments, the frame processor can write combined frames to the buffer and the ISP 115 can directly read the combined frames from the buffer. In some embodiments, the frame processor can successively combine received frames as it receives the frames. In the example embodiment of FIG. 4, the frame processor can receive frame 1, can receive frame 2, can add frame 1 and frame 2 to form a first summed frame, can receive frame 3, can add frame 3 to the first summed frame to form a second summed frame, and so forth. In some embodiments, frames are compressed by an image capture accelerator or other component prior to storing the frames in the buffer. In these embodiments, the compressed frame data can be decompressed prior to being combined by the frame processor, or the frame processor can combine the compressed frame data (for instance by summing or averaging wavelet coefficients).

In some embodiments, the frame controller 110 selects the length of frame capture intervals and provides the selected frame capture interval length to the image sensor 105 for implementation. In addition, the frame controller can select the frame capture rate, and can provide the selected frame capture rate to the image sensor for implementation. The frame controller can also select the length of the frame processing interval, the number of frames to combine into a combined frame, the type of frame combination operation, or any other suitable configuration for use in capturing and processing images. The number of frames to be combined into a combined frame can be based on properties of the frames themselves (such as the resolution or color information of the frames), based on a selected frame capture rate by the image sensor, based on a length of frame processing interval, or based on any other suitable factor. In addition, it should be noted that a component other than the frame controller can select one or more of the frame capture interval length, the frame capture rate, the frame processing interval length, the number of frames to combine into a combined frame, the type of combination operation, and the like. For instance, any of these factors can be selected by the image sensor, the ISP 115, the processing unit 130, or any other component or entity.

Operation

FIG. 5 is a flow chart illustrating image capture in a sparse capture mode, according to one embodiment. A frame is captured 500 by an image sensor over a first interval of time (a frame capture interval). The captured frame is buffered 505, and the image sensor waits for a second interval of time (a blanking interval) before capturing a subsequent image. The buffered frame is processed 515 by an ISP over a third interval of time (a frame processing interval) to produce a processed frame. The frame processing interval is longer than the frame capture interval, but is shorter than the sum of the frame capture interval and the blanking interval.

FIG. 6 is a flow chart illustrating image capture in a combination mode, according to one embodiment. A set of frames is captured 600 at a first frame capture rate by an image sensor. The captured set of frames is buffered 605, and the buffered set of frames is combined 610 to produce a combined frame. The combined frame is then processed 615 by the ISP at a second frame rate slower than the first frame rate to produce a processed frame.

Additional Considerations

Throughout this specification, some embodiments have used the expression "coupled" along with its derivatives. The term "coupled" as used herein is not necessarily limited to two or more elements being in direct physical or electrical contact. Rather, the term "coupled" may also encompass two or more elements are not in direct contact with each other, but yet still co-operate or interact with each other, or are structured to provide a thermal conduction path between the elements.

Likewise, as used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Finally, as used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Upon reading this disclosure, those of skill in the art will appreciate still additional alternative structural and functional designs for a camera expansion module as disclosed from the principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A system that captures and processes frames of frame data, comprising:
    an image sensor that captures frames of frame data representative of light incident upon the image sensor using a rolling shutter and that outputs the frames of frame data, wherein the image sensor captures at least one of the frames over a frame capture interval and then waits over a blanking interval before capturing another frame;
    a buffer that receives and stores the frames output by the image sensor; and
    an image signal processor that retrieves the frames from the buffer and processes the frames over successive frame processing intervals to generate a video having a time interval per frame greater than the frame capture interval, wherein at least one of the successive frame processing intervals is greater than the frame capture interval and is less than or equal to a sum of the frame capture interval and the blanking interval.

2. The system of claim 1, further comprising:
   a processing unit coupled to a computer-readable storage medium including instructions executable by the processing unit to:
      receive a camera mode from an interface module; and
      setting a frame capture rate of the image sensor according to the camera mode, wherein the frame capture interval is based on the frame capture rate.

3. The system of claim 1, wherein the frame capture interval and the blanking interval are set according to a frame processing rate.

4. The system of claim 1, wherein the blanking interval is greater than or equal to one half of the frame capture interval.

5. The system of claim 1, wherein the at least some of the frames captured by the image sensor are compressed before being stored in the buffer as compressed frames and wherein the compressed frames are decompressed before being processed by the image signal processor.

6. A method for capturing and processing frames of frame data, comprising:
    capturing, by an image sensor, frames of frame data representative of light incident upon the image sensor at a frame capture rate using a Bayer color filter array and a rolling shutter, wherein at least one frame is captured over a frame capture interval before another frame is captured after a blanking interval;
    storing, using a buffer, at least some of the frames captured by the image sensor;
    retrieving, by an image signal processor, a subset of the frames captured by the image sensor from the buffer according to a frame processing rate that is one half or less of the frame capture rate; and
    processing, by the image signal processor, the subset of the frames over successive frame processing intervals to generate a video having an output frame rate less than the frame capture rate.

7. The method of claim 6, further comprising:
   receiving a camera mode from an interface module; and
   responsive to receiving the camera mode, setting the frame capture rate of the image sensor according to the camera mode.

8. The method of claim 6, wherein the frame capture interval and the blanking interval are set according to the frame processing rate.

9. The method of claim 6, further comprising:
   performing, by the image signal processor, clean Bayer processing and demosaicing of the retrieved frames.

10. The method of claim 6, wherein storing, using the buffer, at least some of the frames captured by the image sensor comprises compressing the at least some of the frames captured by the image sensor to produce compressed frames for storage in the buffer, and wherein retrieving, by the image signal processor, the subset of the frames captured by the image sensor from the buffer includes decompressing at least some of the compressed frames.

11. A system that captures and processes frames of frame data, comprising:
    an image sensor that captures frames of frame data representative of light incident upon the image sensor at a frame capture rate using a Bayer color filter array and a rolling shutter and that outputs at least some of the frames of frame data, wherein the image sensor captures at least one of the frames over a frame capture interval and then waits over a blanking interval;
    a buffer that receives and stores at least some of the frames output by the image sensor; and
    an image signal processor that retrieves, from the buffer, a subset of the frames captured by the image sensor as retrieved frames according to a frame processing rate that is one half or less of the frame capture rate and that processes the retrieved frames at the frame processing rate to generate a video having an output frame rate less than the frame capture rate.

12. The system of claim 11, further comprising:
    a processing unit coupled to a computer-readable storage medium including instructions executable by the processing unit to:
       receive, from an interface module, a camera mode; and responsive to receiving the camera mode, setting the frame capture rate of the image sensor according to the camera mode.

13. The system of claim 11, wherein the frames stored by the buffer include only the subset of the frames captured by the image sensor.

14. The system of claim 11, wherein the subset of the frames captured by the image sensor includes one half or less of the frames captured by the image sensor.

15. The system of claim 11, wherein the image signal processor retrieves a frame from the buffer in response to detecting that the frame is stored in the buffer.

16. The system of claim 11, wherein the frame capture interval and the blanking interval are set according to the frame capture rate.

17. The system of claim 11, wherein the buffer stores the captured frames in a circular manner.

18. The system of claim 11, further comprising a frame controller that includes the buffer, wherein the frame controller manipulates the capturing of the frames by the image sensor or the processing of retrieved frames by the image signal processor.

19. The system of claim 11, wherein the image signal processor performs clean Bayer processing and demosaicing of the retrieved frames.

20. The system of claim 11, wherein the at least some of the frames are compressed before being stored in the buffer and wherein the image signal processor retrieves the subset of the captured frames by retrieving compressed frames from the buffer and decompressing the compressed frames.

* * * * *